United States Patent [19]

Moh et al.

[11] Patent Number: 5,790,530

[45] Date of Patent: Aug. 4, 1998

[54] MESSAGE-PASSING MULTIPROCESSOR SYSTEM

[75] Inventors: Sang-Man Moh; Sang-Seok Shin; Suk-Han Yoon, all of Yusong-ku, Rep. of Korea

[73] Assignee: Electronics and Telecommunications Research Institute, Daejeon, Rep. of Korea

[21] Appl. No.: 573,494

[22] Filed: Dec. 15, 1995

[30] Foreign Application Priority Data

Nov. 18, 1995 [KR] Rep. of Korea .................. 95-42112

[51] Int. Cl.[6] ........................................... H04L 12/46
[52] U.S. Cl. ........................................... 370/363; 370/402
[58] Field of Search ........................... 370/85.13, 94.1, 370/94.3, 82, 60, 99, 92, 355, 356, 357, 360, 362, 363, 364, 365, 401, 402, 428, 465, 470, 471, 473, 474; 395/200.11, 200.07, 200.08, 200.17, 200.31, 200.6, 200.61, 200.62, 200.68, 200.8

[56] References Cited

U.S. PATENT DOCUMENTS

| | | | |
|---|---|---|---|
| 5,058,110 | 10/1991 | Beach et al. | 370/85.6 |
| 5,103,446 | 4/1992 | Fischer | 370/236 |
| 5,201,040 | 4/1993 | Wada et al. | 395/400 |
| 5,214,759 | 5/1993 | Yamaoka et al. | 395/200 |
| 5,410,654 | 4/1995 | Foster et al. | 395/275 |
| 5,440,545 | 8/1995 | Buchholtz et al. | 370/426 |
| 5,446,841 | 8/1995 | Kitano et al. | 395/200 |
| 5,469,542 | 11/1995 | Foster et al. | 395/200.01 |
| 5,471,592 | 11/1995 | Gove et al. | 395/300.03 |
| 5,485,582 | 1/1996 | Beach et al. | 370/85.6 |
| 5,490,252 | 2/1996 | Okabayashi | 395/250 |
| 5,524,007 | 6/1996 | White et al. | 370/465 |
| 5,602,848 | 2/1997 | Andrews et al. | 370/465 |
| 5,613,068 | 3/1997 | Gregg et al. | 395/200.13 |

OTHER PUBLICATIONS

Hwang, K.: "Multiprocessors and Multicomputers", pp. 331–544; Advanced Computer Architecture (Paralletism, Calability, Programmability), McGraw–Hill, 1993.

*Primary Examiner*—Alpus H. Hsu
*Assistant Examiner*—Kwang B. Yao
*Attorney, Agent, or Firm*—Jacobson, Price, Holman & Stern, PLLC

[57] ABSTRACT

A message-passing multiprocessor system, such as, a network interface, a method for transferring messages between a node and a node, and a method for formatting the same in a message-passing computer system are disclosed herein. In the network interface for a computer system there are a plurality of nodes connected with one another through an interconnection network for communicating messages, and more than one processor, and a local shared memory, which are connected with one another through a node bus. These components are connected via the network interface to the interconnection network, the multiprocessor comprises a local bus acting as a path for transferring data in the network interface, a bus connection for connecting the node bus and the local bus, a transferring component for packetizing the messages requested by the processor, if data message, by reading them out from the local shared memory via the local bus, the bus connection and the node bus to produce a packet, and sending the packet to the interconnection network, and a receiver for receiving the message packet from the interconnection network, restoring it to produce a restored message and, if data portion of the data message, storing the restored packet body into the local shared memory through the local bus, the bus connection and the node bus.

52 Claims, 8 Drawing Sheets

MESSAGE-PASSING MULTIPROCESSOR SYSTEM

FIELD OF THE INVENTION

The present invention relates to a message-passing multiprocessor system, and more particularly to a network interface, a method for transferring messages between a node and another node, and a method for formatting the same in a message-passing computer system.

BACKGROUND OF THE INVENTION

In general, a message-passing computer system is a parallel computer system in which a plurality of nodes operate cooperatively with one another by interchanging the messages through an interconnection network. As each node of the message-passing computer sends and receives the messages via the interconnection network, the communications between a node and another node have a great influence on the performance of the system. Thus, the latency and the bandwidth of the message become important parameters in designing the message-passing computer system.

Several topologies for the interconnection network have been studied in the light of various design points and these interconnection networks have been effectively used in the shared-memory multiprocessor computer system well as the message-passing computer system.

The network interface is a hardware device which takes the role of a bridge for sending and receiving the messages by connecting the nodes to the interconnection network, and in general should be designed to minimize the latency and to maximize the bandwidth of the message.

Now, the parallel processor system proposed in the prior art will be described briefly.

First, it is known from U.S. Pat. No. 4,766,534, issued to E. P. DeBenedictis, AT&T Bell Lab., discloses an interconnection network and a method for implementing the same devised to perform different communication protocols, which will be discussed hereinafter.

The parallel processing system, in which the interconnection network and a method for implementing the same are applied, is the one in which a plurality of nodes are connected to one interconnection network and each node sends and receives the messages, so that the information is interchanged one another. The interconnection network and the method for implementing the same can perform the protocols such as a hierarchical tree connection and a distributed set of the shared memory selectively. Furthermore, each node has protocol processors apart from the computing processor, and controls them to support several communication protocols. In the interconnection network, separate input/output ports, and input/output buffers corresponding to each port are provided.

However, the interconnection network has a problem that it cannot support both a memory-mapped transfer technique and a Direct Memory Access (hereinafter, referred to as "DMA) based transfer technique. As a result, the optimal transfer technique cannot be used contingent on the characteristics and attributes of the messages.

Secondly, U.S. Pat. No. 5,058,110, issued to R. Beach, Ultra Network Technologies Corp., discloses the network interface and the message transfer protocols for use in the computer communication network having one or more hubs.

The network interface connected to a backplane bus has First In First Out (hereinafter, referred to as "FIFO") buffers for sending and receiving respectively, and supports two types of message formats, such as a network control message and a data transfer message. Furthermore, the network interface defines the input/output port status words, and uses them to control the transfer hardware of the input/output port.

However, because the structures of the control messages and the data messages are insufficient to support the various transfer functions, this technique has a drawback that it cannot provide various transfer functions.

Lastly, the network interfaces implemented in practice in the prior art, have been designed by using either the memory-mapped transfer technique or the DMA based transfer technique. The memory-mapped transfer technique is preferred and is widely used in practice.

In the memory-mapped transfer technique, there is a message buffer where address is assigned in the network interface, and if the message is directly stored in the message buffer by means of the writing operations of programs, the network interface then transfers the corresponding messages.

According to the DMA-based transfer technique, if the programs provide the start address of the memory storing the message, the length of the message and the transfer information, the network interface directly reads the corresponding messages from the memory by using DMA technique and transfers them.

However, this technique also has a disadvantage that it is not sufficient in providing a method for formatting messages to support the above transfer technique.

Therefore, there is a need to overcome the above disadvantages in the prior art and to provide a network interface and a method for transferring messages which optimize the message transfer in the message-passing computer system and support various transfer functions with the aid of a method for formatting the messages which is required for message transfer.

The preceding objectives should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

A multiprocessor system of the present invention is defined by the claims with a specific embodiment shown in the attached drawings. For the purpose of summarizing the invention, the first embodiment of the present invention relates to a network interface for a computer system in which a plurality of nodes are connected with one another through an interconnection network for communicating messages, and more than one of processors, a local shared memory and, if necessary, an input device, which are connected with one another through a node bus, are connected through the network interface to the interconnection network. The network interface comprises a local bus acting as a path for transferring data in the network interface, a bus connection means for connecting the node bus and the local bus, a transmitting means for packetizing the messages requested by the processor by reading them out from the local shared memory through the local bus, the bus connection means and the node bus to produce a message packet, and transmitting the message packet to the interconnection network, and a receiving means for receiving the message packet from the interconnection network, restoring it to produce a restored message and storing the restored message into the local shared memory through the local bus, the bus connection means and the node bus. According to the second embodiment of the present invention, it relates to a method of transmitting messages at source nodes in a message communication computer system. In a message communication computer system in which a plurality of source nodes and destination nodes are connected with one another through an interconnection network for communicating messages, and more than one of processors and a local shared memory, which are connected with each other through a node bus, are connected through a network interface to the interconnection network, the method of transmitting messages at the source nodes comprises the steps of: a) requesting transfer of the messages to the network interface at the source node by the processor at the source node; b) reading out the messages to be transferred from the local shared memory by the network interface at the source node if data message; c) packetizing the messages by the network interface at the source node to produce a message packet and transfer the message packet to the destination node; d) receiving an acknowledgement packet from the destination node by the network interface at the source node; and e) enabling a transfer completing interrupt.

According to the third embodiment of the present invention, it relates to a method of transmitting messages at destination nodes in a message communication computer system. In a message communication computer system in which a plurality of source nodes and destination nodes are connected with one another through an interconnection network for communicating messages, and a plurality of processors and a local shared memory, which are connected with one another through a node bus, are connected through a network interface to the interconnection network, the method for transmitting messages at the destination nodes comprises the steps of: a) receiving a message packet for restoring an original packet body from the message packet by the network interface at the destination node; b) transferring a corresponding acknowledgement packet depending on the restored message to the source node by the network interface at the destination node; c) storing a data packet into the local shared memory at the destination node by the network interface at the destination node if data message; and d) informing the processor at the destination node of the fact that a the message receiving step has been completed.

According to the fourth embodiment of the present invention, it relates to a method of formatting messages for transmitting the messages in a message communication computer system. In a message communication computer system in which a plurality of source nodes and destination nodes are connected with one another through an interconnection network for communicating messages, and more than one of processors and a local shared memory, which are connected with one another through a node bus, are connected through a network interface to the interconnection network, the method of formatting messages for transmitting the messages comprises formatting a plurality of messages including a data messages being a direct object to be transferred, a broadcast and point-to-point control message including different control instructions required for a broadcast transfer and a point-to-point transfer for transferring the messages to all of the nodes connected to the interconnection network by the network interface, a multicast control message including different control instruction required for a multicast transfer, and a control information flit (CIF) including different information on a transfer packet.

According to the features of the present invention, the messages are transferred in the optimal technique contingent on the characteristics and the attributes of the message by supporting both the techniques, such as a memory-mapped transfer technique and a DMA-based transfer technique. It also can be transferred transparently to the software. Furthermore, the latency can be reduced by supporting the broadcast transfer and the multicast transfer for the control message in hardware, and the bandwidth can be increased, so that the message transfer can be optimized, thereby providing various transfer functions.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be made to the following detailed description taken in conjunction with the accompanying drawings in which.

Similar reference characters refer to similar parts throughout the present invention.

DETAILED DESCRIPTION OF THE INVENTION

Figure 1:
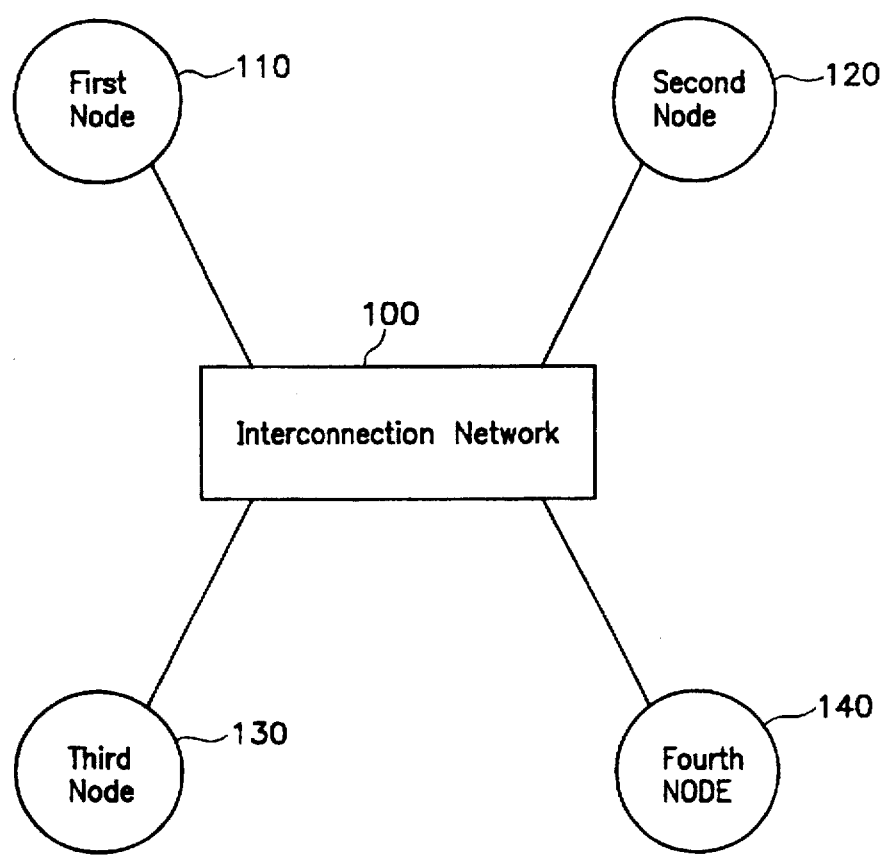
FIG. 1 illustrates a connection diagram of the interconnection network according to the present invention.

FIG. 1 represents a connection diagram of the interconnection network according to the present invention.

Referring to the drawing, four nodes 110, 120, 130 and 140 are simultaneously connected to an interconnection network 100, to which at least two nodes to 128 nodes may be connected, thereby providing a much broader extensibility.

Figure 2:
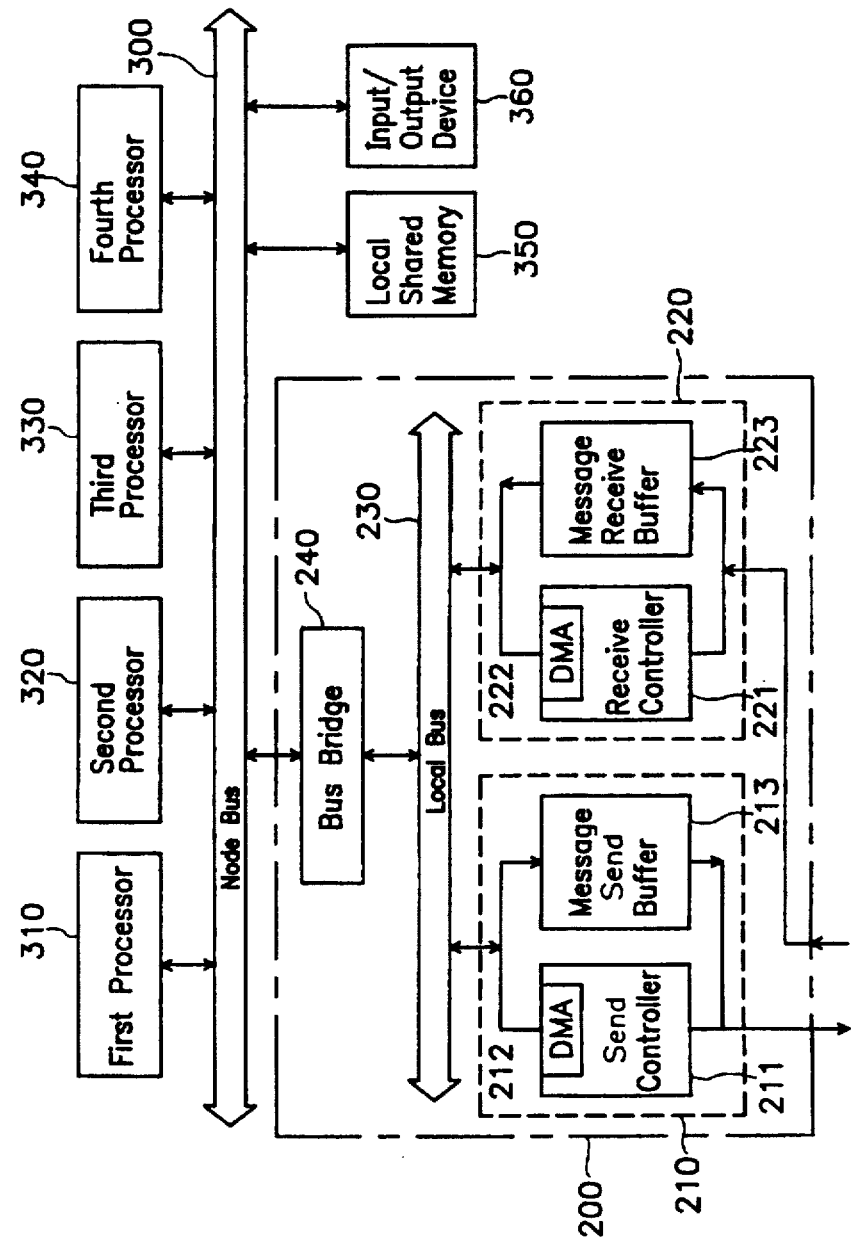
FIG. 2 illustrates a block diagram of the network interface according to the present invention.

FIG. 2 illustrates a block diagram of the network interface according to the present invention.

In the figure, at the respective nodes connected to the interconnection network 100, at least one processor to four processors may be provided four processors being depicted in FIG. 2. Each processor 310, 320, 330 and 340 is connected to a node bus 300 and forms a symmetric multiprocessor structure having a local shared memory 350 in common.

An input/output device 360 is shown connected to the node bus 300, but if the node does not have an input/output requirement, it is not connected to the node bus 300 of the node.

A network interface 200 as a device for connecting the nodes to the interconnection network 100 is connected at the node side to the node bus 300 and at the interconnection network side to an input/output port. The network interface 200 has a separate structure comprising a transmitter sender 210 and a receiver 220, each of which is connected to a local bus 230 respectively. A bus bridge 240 interfaces the node bus 300 and the local bus 230.

The sender 210 is comprised of a message send buffer 213, a DMA 212 and a send controller 211. The message send buffer 213 is comprised of a DMA data buffer and two message transfer buffers, wherein the DMA data buffer supports the DMA based transfer. The send controller 211 controls a series of operations which comprise packetizing the messages requested by the processor and sending them to the interconnection network through the input port of the interconnection network. The DMA 212 supports the DMA based transfer, and reads directly the message from the local shared memory by means of the DMA operation.

The receiver 220 is comprised of a message receive buffer 223, a DMA 222 and a receiving controller 221. The message receiving buffer for message receiving 223 is comprised of a DMA data buffer and two message receive buffers, wherein the DMA data buffer supports the DMA based transfer. The receiving controller 221 controls a series of operations which comprises restoring the packets transferred from the interconnection network through the output port of the interconnection network and receiving them. The DMA 222 supports the DMA based transfer, and if it receives the messages in the form of the DMA based transfer type, it stores directly the messages to the local shared memory 350 by means of the DMA operation.

The network interface 200 transfers two types of messages, such as a control message and a data message, to support efficiently the message transfer between the nodes. As the control messages have the size which is at most 64 bytes but relatively small, and are generated directly by the processor, they can be transferred by means of the memory-mapped transfer technique by which the point-to-point transfer, the broadcast transfer and multicast transfer are supported. The data messages have a size which is at most 1 Megabyte and relatively large, and are used to transfer the data in the local shared memory 350 to another node. Because the data messages are present in the local shared memory 350, they are transferred in the DMA-based transfer technique.

Figure 3:
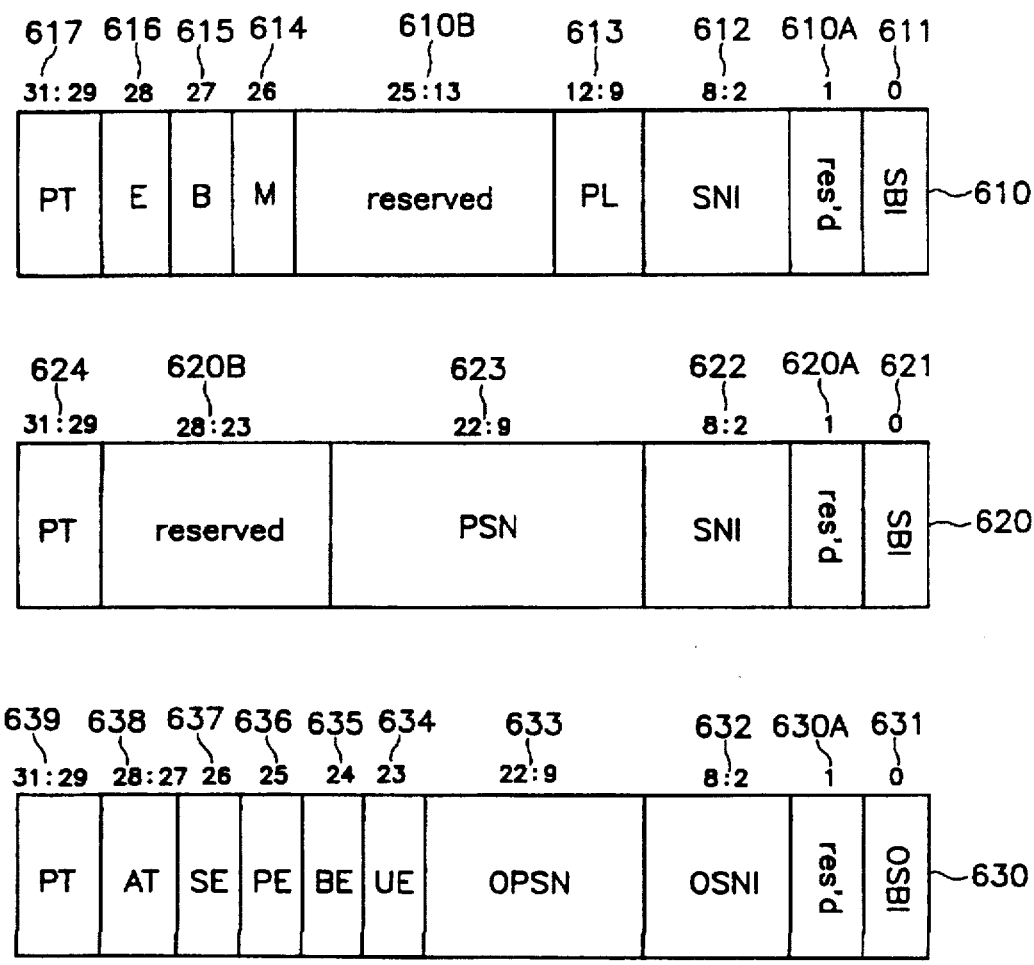
FIG. 3 illustrates a structure of the control information flit according to the present invention.

FIG. 3 illustrates a structure of the control information flit. The packet is comprised of a header and a body. The header is comprised of a routing tag and a control information flit. The routing tag designates the transfer path for the packet, and is used when the interconnection network 100 transfers the packet to the destination node. The control information flits are information used to control the packet sending/receiving, and if the source node generates and sends the control information flits, the destination node decodes them, such that the transferred control information for the received packet can be obtained.

Referring again to FIG. 3, the control information flits include a control information flit 610 for control packet and the data control packet, a control information flit 620 for data packet, and a control information packet 630 for an acknowledgement packet. The control packet is the one to transfer the control messages, and the data control packet is the one to transfer the data transfer information of the data messages. The data packet is the one transferring the data portion of the data messages, and the acknowledgement packet is the one replying the acknowledgement of the transferred packet.

The control information flit 610 for control packet and data control packet is used to transfer the control packet and data control packet, and is comprised of a Source Buffer Identifier field (hereinafter, referred to as "SBI field"; 611), a Source Node Identifier field (hereinafter, referred to as "SNI field"; 612), a Packet Length field (hereinafter, referred to as "PL field"; 613), a Multicast bit (hereinafter, referred to as "M bit"; 614), a broadcast bit (hereinafter, referred to as "B bit"; 615), a Emergency bit (hereinafter, referred to as "E bit"; 616), a Packet Type field (hereinafter, referred to as "PT field"; 617) and two reserved fields 610A and 610B.

The SBI field 611 represents a source buffer identifier, in which it represents the transfer packet transferred from which buffer of the two source buffers within message send the buffer 213 in the network interface 200 existed at the source node. The network interface 200 at the source node can identify the acknowledgement of the specific packet by receiving back the SBI field 611 upon packet acknowledgement. The SNI field 612 is a source node identifier which represents the original identifier of the source node transferring the messages. The PL field 613 is the one which represents the packet length to be transferred, and represents the actual length of the packet body except for the packet header(i.e. the routing tag and control information flit). This actual length is equal to 4 times the sum of PL and 1, hence it equals 4×(PL+1) . The M bit 614 is the one representing the multicast transfer, and if this bit is "1", it means that the multicast control message is transferred. The B bit 615 is the one representing the broadcast transfer, and if this bit is "1", it means that the broadcast control message is transferred. The E bit 616 is the one representing the Emergency transfer, and if this bit is "1", it means that the network interface 200 transfers the corresponding message prior to the other messages. The PT field 617 is the one representing the packet type, it indicates one of the control packet, the data control packet, the data packet and the acknowledgement packet. If the PT field 617 is "000", it means that the packet is a control packet, and if this field is "100", it means that the packet is a data control packet. The reserved fields 610A and 610B are the areas being not used, and the values thereof have no meaning, but these fields can be used by defining them when extending the function of the system.

The control information flit 620 for data packet is used to transfer the data packet, and is comprised of a SBI field 621, a SNI field 622, a PSN field 623, a PT field 624 and two reserved fields 620A and 620B.

The SBI field 621 is a source buffer identifier, in which it represents the transfer packet transferred from which buffer of the two source buffers within the message send buffer 213 in the network interface 200 existed at the source node. The SNI field 622 is a source node identifier, which represents the original identifier at the source node transferring the messages. The PSN field 623 represents the packet sequence number of the data packet transferred. The PT field 624 is the one representing the packet type, indicating one of the control packet, the data control packet, the data packet and the acknowledgement packet. If the PT field 624 is "100", it means that the packet is a data packet. The reserved fields 620A and 620B are the areas being not used, and the values thereof have no meaning, but these fields can be used by defining them when extending the function of the system.

The control information flit 630 for acknowledgement packet is used to transfer the acknowledgement packet, and is comprised of an Original Source Buffer Identifier field (hereinafter, referred to as "OSBI field"; 631), an Original Source Node Identifier field (hereinafter, referred to as "OSNI field"; 632), a Original Packet Sequence Number field (hereinafter, referred to as "OPSN field"; 633), a Unacceptable Error bit (hereinafter, referred to as "UE bit"; 634), a Buffer-full Error bit (hereinafter, referred to as "BE bit"; 635), a Parity Error bit (hereinafter, referred to as "PE bit"; 636), a Sequence Error bit (hereinafter, referred to as "SE bit"; 637), a Acknowledgement Type field (hereinafter, referred to as "AT field"; 638), a Packet Type field (hereinafter, referred to as "PT field"; 639) and a reserved field 630A.

The OSBI field 631 is a original source buffer identifier of the received packet having the transfer errors, in which it represents the transfer packet having errors transferred from which buffer of the two source buffers within the message send buffer 213 in the network interface 200 existed at the source node. The OSNI field 632 is a source node identifier of the received packet having errors, which represents the original identifier of the source node transferring the received packet having transfer errors. The OPSN field 633 is the one which has a meaning only when the acknowledgement type is the data packet error acknowledgement, i.e. the AT field 638 is "110", and this field represents the packet sequence number of the data packet having the transfer errors. The UE bit 634 is the one representing the unacceptable error, which means that the packet cannot be received, and this is not caused by the sequence error, the parity error and the buffer-full error. The BE bit 635 is the one representing the buffer-full error, which means that the received message cannot be stored because the message receiving buffer is full without vacant spaces. The PE bit 636 is the one representing the parity error, which means that a parity error is detected in the received packet. The SE bit 637 is the one representing the sequence error, which means that the transfer protocols are not matching with each other during the packet transfer. The AT field 638 is the one representing the acknowledgement type, and if this field is "00", it means that the acknowledgement represents a receiving acknowledgement for the whole of message, and if this field is "01", it means that the acknowledgement represents a receiving acknowledgement for data transfer information. Also, if this field is "10", it means that the acknowledgement represents an error acknowledgement for data packet, and if this field is "11", the acknowledgement represents a packet error acknowledgement other than the data packet error acknowledgement.

The receiving acknowledgement for whole of the message means that all packets of the message are received, and the receiving acknowledgement for the data transfer information means that the data transfer information is successfully received. The error acknowledgement for data packet means that the transfer error occurs in the data packet, and the packet error acknowledgement other than the data packet error acknowledgement means that the transfer error occurs in the transfer packet, except for the data packet such as a control packet and a data control packet and acknowledge packet.

The PT field 639 is the one representing the packet type, which indicates one of the control packet, the data control packet, the data packet and the acknowledgement packet. If the PT field 639 is "001", it means that the packet is a acknowledgement packet. The reserved field 630A is an area not being used, and the values thereof have no meaning, but this field can be used by defining it when extending the function of the system.

Figure 4:
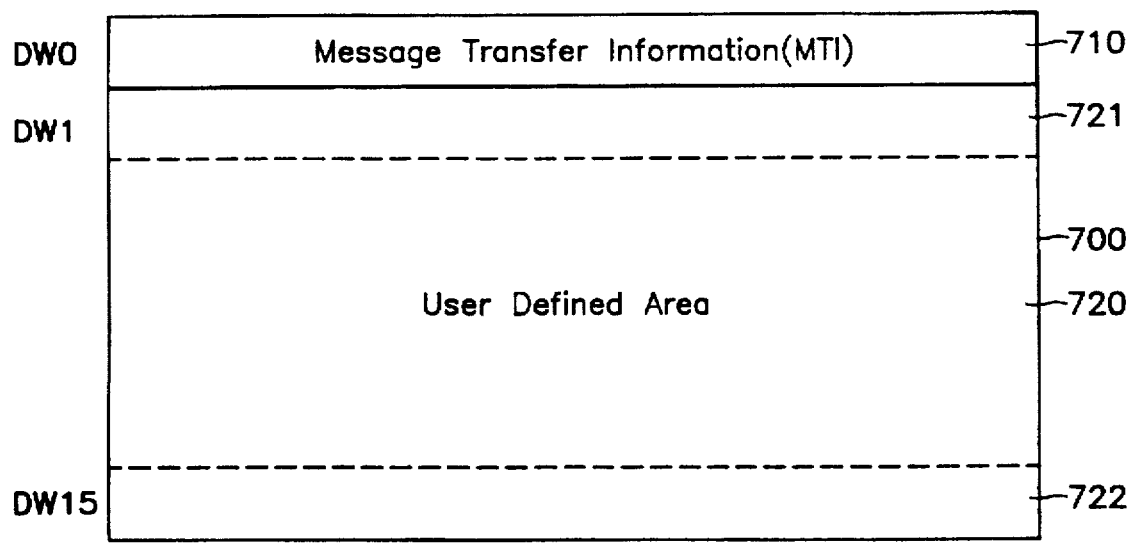
FIG. 4 illustrates a structure of the broadcast and point-to-point control message according to the present invention.
Figure 4:
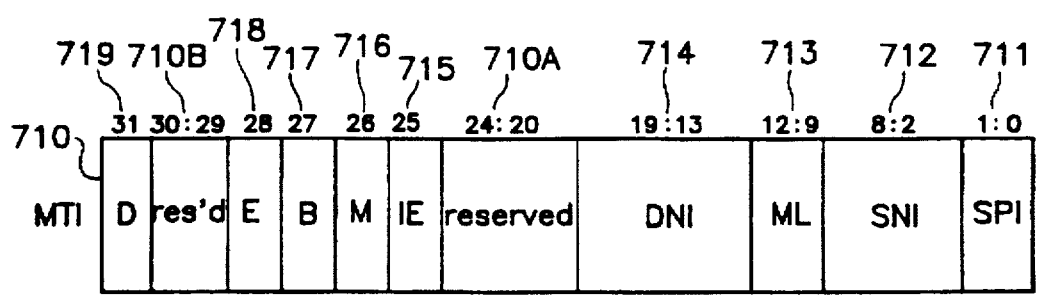

FIG. 4 illustrates a structure of a broadcast and point-to-point control message.

Referring to drawing, a broadcast and point-to-point control message 700 is comprised of a message transfer information 710 and a user defined area 720. The size of the broadcast and point-to-point control message is at least 4 bytes to 64 bytes, and increases at the rate of 4 bytes. The user defined area 720 is the area from DW1 721, which is the second double word 722, to and including DW15. The message transfer information 710 includes the basic control information relating to the message transfer.

Figure 5:
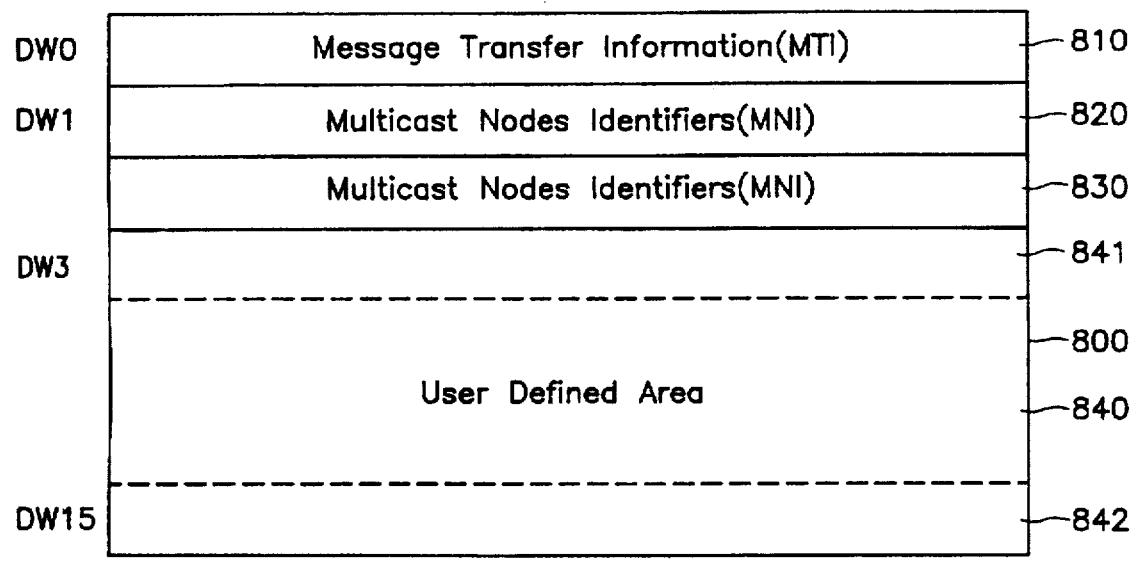
FIG. 5 illustrates a structure of the multicast control message according to the present invention.
Figure 5:
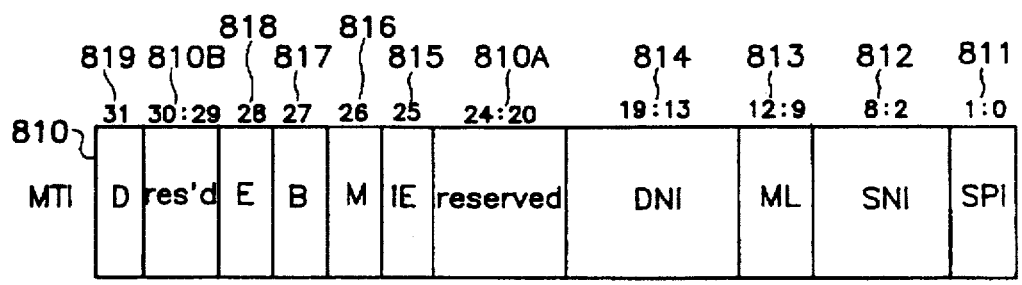
Figure 5:
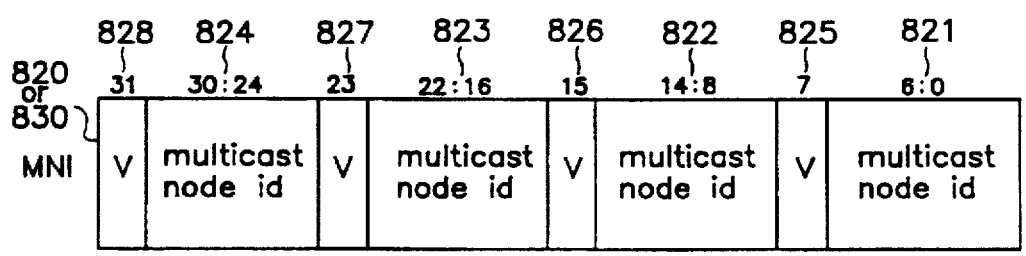

The SPI field 711 is the one representing the source processor identifier, and it means which processor of the 4 processors 310, 320, 330 or 340 located at the source node has requested the message transfer to the network interface. The SNI field 712 is a source node identifier, which represents the original identifier at the source node transferring the messages. The ML field 713 is the one which represents the message length, which represents the length of the message to be transferred. Here, the actual length of the message is equal to 4 times the sum of ML and 1, hence it equals 4×(ML+1). The DNI field 714 is a destination node identifier, which represents the original identifier at the destination node to which the messages will be transferred. Since at most 128 nodes can be connected to the interconnection network, $\log_2 128(=7)$ bits are assigned to the SNI field and the DNI field respectively, to identify all the source nodes and destination nodes. The IE bit 715 is the one which represents the success interrupt enable for the transfer, and if this bit is "1", the network interface 200 informs the processor that it has successfully transferred the requested message by enabling a transfer success interrupt when the messages have been successfully transferred without errors. The M bit 716 is the one representing the multicast transfer, and it should be "0"for the broadcast and point-to-point transfer. The B bit 717 is the one representing the broadcast transfer, and if this bit is "1", the network interface 200 transfers the message to all the nodes connected to the interconnection network. The E bit 718 is the one representing the Emergency transfer, and if this bit is "1", the network interface 200 transfers the corresponding message prior to the other messages. The D bit 719 is the one representing whether or not it is the data transfer information forming the data message. The reserved fields 710A and 710B are the areas being not used, and the values thereof have no meaning, but these fields can be used by defining them when extending the function of the system. FIG. 5 illustrates a structure of a multicast control message.

In FIG. 5, the multicast control message 800 is comprised of a message transfer information 810, two multicast node identifiers 820 and 830 and a user defined area. The size of the multicast control massage is at least 12 bytes to 64 bytes, and increases at the rate of 4 bytes. The user defined area 840 is the area from DW3 841, which is the 4th double word, to and including DW15 842. The message transfer information 810 includes the basic control information in connection with the message transfer.

The SPI field 811 is the one representing the source processor identifier, and it means which processor of the 4 processors 310, 320, 330 or 340 located at the source node has requested the message transfer. The SNI field 812 is a source node identifier, which represents the original identifier at the source node transferring the messages. The ML field 813 is the one which represents the message length, representing the length of the message to be transferred. Here, the actual length of the message is equal to 4 times the sum of ML and 1, hence it equals 4×(ML+1). The DNI field 814 is a destination node identifier which represents the original identifier at the destination node transferring the messages. Since at most 128 nodes can be connected to the interconnection network, $\log_2 128(=7)$ bits are assigned to the SNI field and the DNI field respectively, to identify all the source nodes and destination nodes. The IE bit 815 is the one which represents the success interrupt enable for transfer, and if this bit is "1", the network interface 200 informs the processor that it has successfully transferred the requested message by enabling a transfer success interrupt when the messages are successfully transferred without errors. The M bit 816 is the one representing the multicast transfer, and it should be "1" for the multicast control message. The B bit 817 is the one representing the broadcast transfer, and it should be "0" for the multicast control message. The E bit 818 is the one representing the emergency transfer, and if this bit is "1", the network interface 200 transfers the corresponding message prior to the other messages. The D bit 819 is the one representing whether it is the data transfer information forming the data message, and this bit should be "0" for the multicast control message. The reserved fields 810A and 810B are the areas being not used, and the values thereof have no meaning, but these fields can be used by defining them when extending the function of the system.

The multicast nodes identifiers 820 and 830 represent the identifiers of the destination nodes to be transferred into the multicast, and can assign at most 4 nodes respectively. Thus, they can assign 8 nodes in total. Each bit of the V bits 825 through 828 respectively represents whether the next node identifier 821 through 824 is valid or not. If the V bit 825 through 828 is "1", it means that the node identifier positioned next to the corresponding V bit is valid.

The network interface 200 transfers the multicast control message 800 only to each node whose V bit is set at "1". Since the multicast transfers are not supported in the interconnection network 100 of the target message-passing computer, the multicast control message 800 requested for transfer is converted into the point-to-point transfer, and then will be transferred to each node whose V bit is set at "1".

Figure 6:
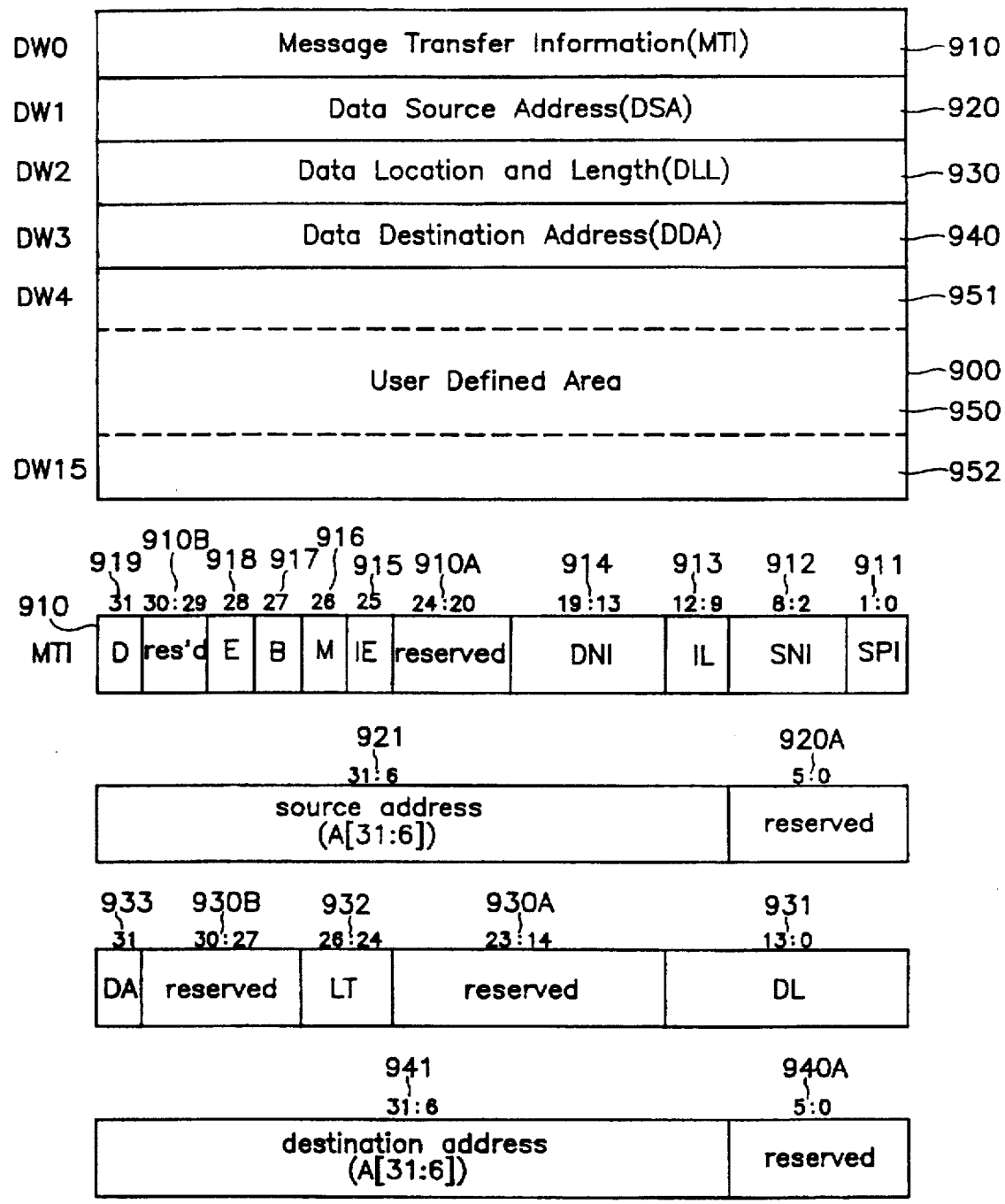
FIG. 6 illustrates a structure of the data transfer information according to the present invention.

FIG. 6 illustrates a structure of a data transfer information. The data message is comprised of a data transfer information 900 and data. The data transfer information 900 is comprised of a message transfer information 910, a data source address 920, a data location and length 930, a data destination address 940 and a user defined area 950. The user defined area 950 is the area from DW4 951, which is the 5th double word, to and including DW15 952.

The data transfer information 900 is stored in the message send buffer 213 of the network interface 200 by the processors 310, 320, 330 or 340, and the data are contained in the local shared memory 350. The size of the data transfer information 900 is at least 16 bytes to 64 bytes, and increases at the rate of 4 bytes. Furthermore, the size of the data is at least 64 bytes to 1 megabyte, and increases at the rate of 64 bytes.

The message transfer information 910 includes the basic control information relating to the message transfer. The SPI field 911 is the one representing the source processor identifier, and it indicates which processor of the 4 processors 310, 320, 330 or 340 at the source node requests the message transfer. The SNI field 912 is a source node identifier which represents the original identifier at the source node transferring the messages. The IL field 913 is the one which represents the data transfer information length, and it represents the length of the data transfer information to be transferred. Here, this actual length of the data transfer information is equal to 4 times the sum of IL and 1, hence it equals 4×(IL+1). The DNI field 914 is a destination node identifier which represents the original identifier at the destination node transferring the messages. Since at most 128 nodes can be connected to the interconnection network, $\log_2 128(=7)$ bits are assigned to the SNI field and the DNI field respectively, to identify all the source nodes and the destination nodes. The IE bit 915 is the one which represents the success interrupt enable for transfer, and if this bit is "1", the network interfacing 200 informs the processor that it has successfully transferred the message by enabling a transfer success interrupt when the messages are successfully transferred without error. For the data message, as the multicast transfer, the broadcast transfer, the point-to-point transfer and emergency transfer are not supported, the M bit 916, the B bit 917 and the E bit 918 have no meaning. The D bit 919 is the one representing whether it is the data transfer information forming the data message, and it should be "1" for the data transfer information. The reserved fields 910A and 910B are the areas being not used, and the values thereof have no meaning, but these fields can be used by defining them when extending the function of the system.

The data source address 920 is comprised of a source address field 921 and a reserved field 920A. The source address field 921 indicates the start address of the transfer data to be transferred, which are stored in the local shared memory 350 at the source node. Here, since the data constituting the data message increase at the rate of 64 bytes, the source address field 921 represents only the 26 most significant bits the six least significant bits $\log_2 64(=6)$ bit of the 32 bit local shared memory address are not needed. The reserved field 920A is the area being not used, and the values thereof have no meaning.

The data location and length 930 is comprised of a data Length field (hereinafter, referred to as "DL field"; 931), a Location in Temporary data buffer field (hereinafter, referred to as "LT field"; 932) a Destination address Assigned bit (hereinafter, referred to as "DA bit"; 933) and two reserved fields 930A and 930B.

The DL field 931 represents the length of the data to be transferred. Since the data length is at most 1 mega bytes, and increases at the rate of 64 bytes, 14 bits are required to represent the data length. The LT field 932 has a meaning only when the DA bit 933 is "0", and represents the frame location of the Temporary Data Buffer (hereinafter, referred to as "TDB") receiving the data from the destination node and storing them. The TDB is a part of the local shared memory 350, and the memory size is in total 32K bytes comprised of 8 frames, each frame having 4k bytes. The DA bit 933 is the one which represents whether the destination address of the data transfer is assigned or not. If it is "1", it means that the destination address is assigned, and if it is "0", it means that the destination address is not assigned. The reserved fields 930A and 930B are the areas being not used, and the values thereof have no meaning. The data destination address 940 is comprised of a destination address field 941 and a reserved field 920A, and has a meaning only when the DA bit is "1". The received data are stored in the local shared memory of the destination node, and the destination address field 941 indicates the start address of the local shared memory 350. Here, since the data constituting the data message increase at the rate of 64 bytes, the destination address field 941 represents only the most significant 26 bits and does not need the least significant bits $\log_2 64(=6)$ of the 32 bit local shared memory address. The reserved field 940A is the area being not used, and the values thereof have no meaning.

In order to transfer the message via the interconnection network, the messages must undergo the packetizing process which converts the message into the packet format. If the sender 210 of the network interface 200 at the source node packetizes and sends the message to the interconnection network, the receiver 220 of the network interface 200 at the destination node receives the message transferred and performs the restoring process. In this series of the message sending/receiving process, the network interface 200 at the source node and the network interface 200 at the destination node mutually exchange the control information concerning the packet transfer.

Figure 7:
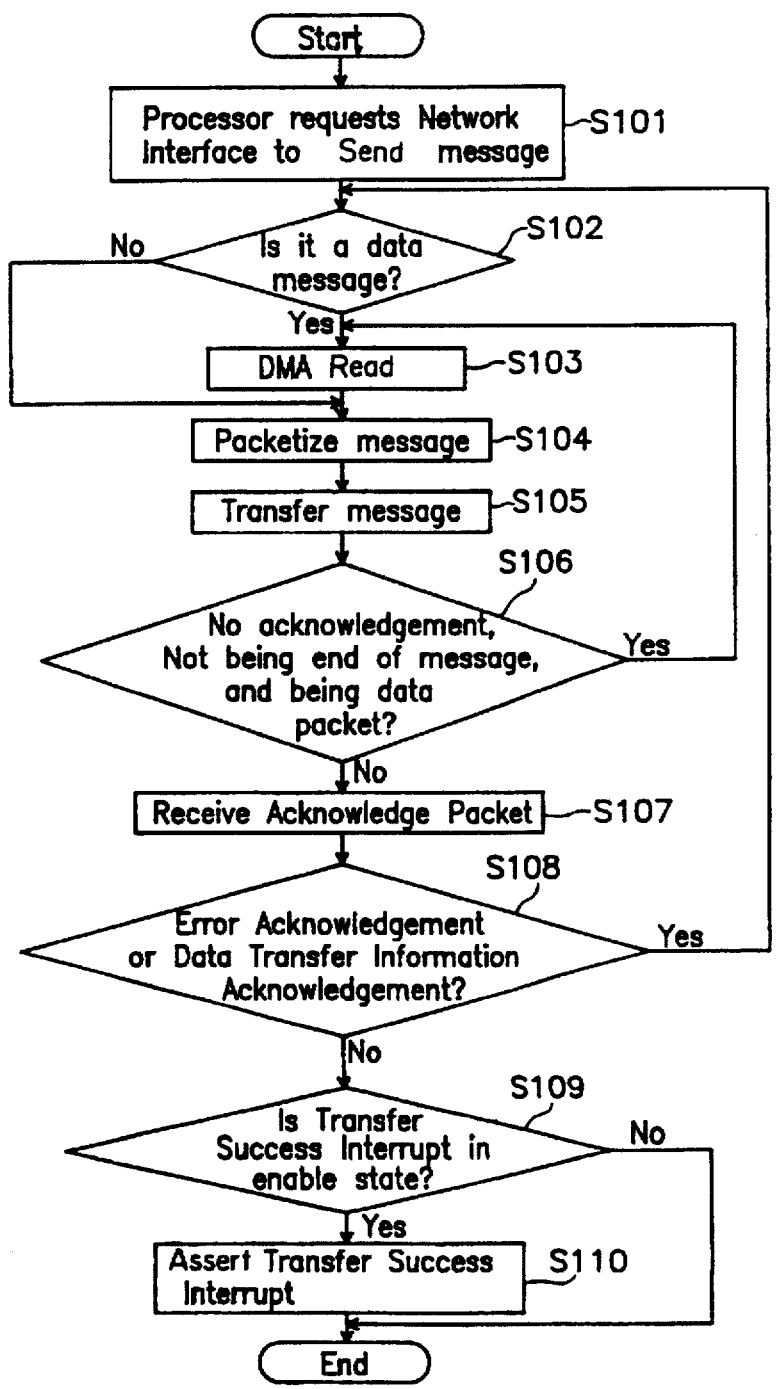
FIG. 7 is a flowchart to explain a method for sending the messages according to the present invention.

FIG. 7 is a flowchart for explaining a method for sending the messages. Referring now to FIG. 7, a method of sending messages is described hereinafter.

At step S101, in order to send the messages, the processor at the source node stores a control messages 700 or 800 or a data transfer information 900 of the data message into the message send buffer 213 in the network interface 200 at the source node to request the message transfer.

At step S102, the network interface 200 at the source node determines whether the message requested for transfer is a control message or a data message at step S101. If the message is identified as a data message at step S102, the network interface 200 at the source node reads the data whose size is 64 bytes, from the local shared memory 350 using the DMA operation, at step S103.

At steps S104 and S105, the network interface 200 at the source node packetizes the messages and transfers the resulting(packetized) packet to the destination node.

At step S106, it is determined whether there is presently no acknowledgement, it is not the end of the message and it is a data packet. If there is presently no acknowledgement, it is not the end of the message and it is a data packet, it returns to step S103 to repeat the above procedure. On the contrary, if it is determined that there exists an acknowledgement, it is the end of the message or it is not a data packet, it proceeds to step S107. At step S107, the network interface 200 at the source node receives the acknowledgement packet from the destination node.

At step S108, the network interface 200 at the source node determines whether the acknowledgement packet received at step S107 is an error acknowledgement or a data transfer information acknowledgement. If the received acknowledgement packet is an error acknowledgement or a data transfer information acknowledgement, it returns to step S102 to repeat the above procedure. However, if the received acknowledgement packet is not an error acknowledgement and not a data transfer information acknowledgement, it proceeds to step S109.

At step S109, the network interface 200 at the source node determines whether the transfer success interrupt is in the enable state or not. If the transfer success interrupt is not in the enable state, the procedure ends. However, in case that the transfer success interrupt is in the enable state, the procedure ends after it asserts the transfer success interrupt to the processor at step S110.

Figure 8:
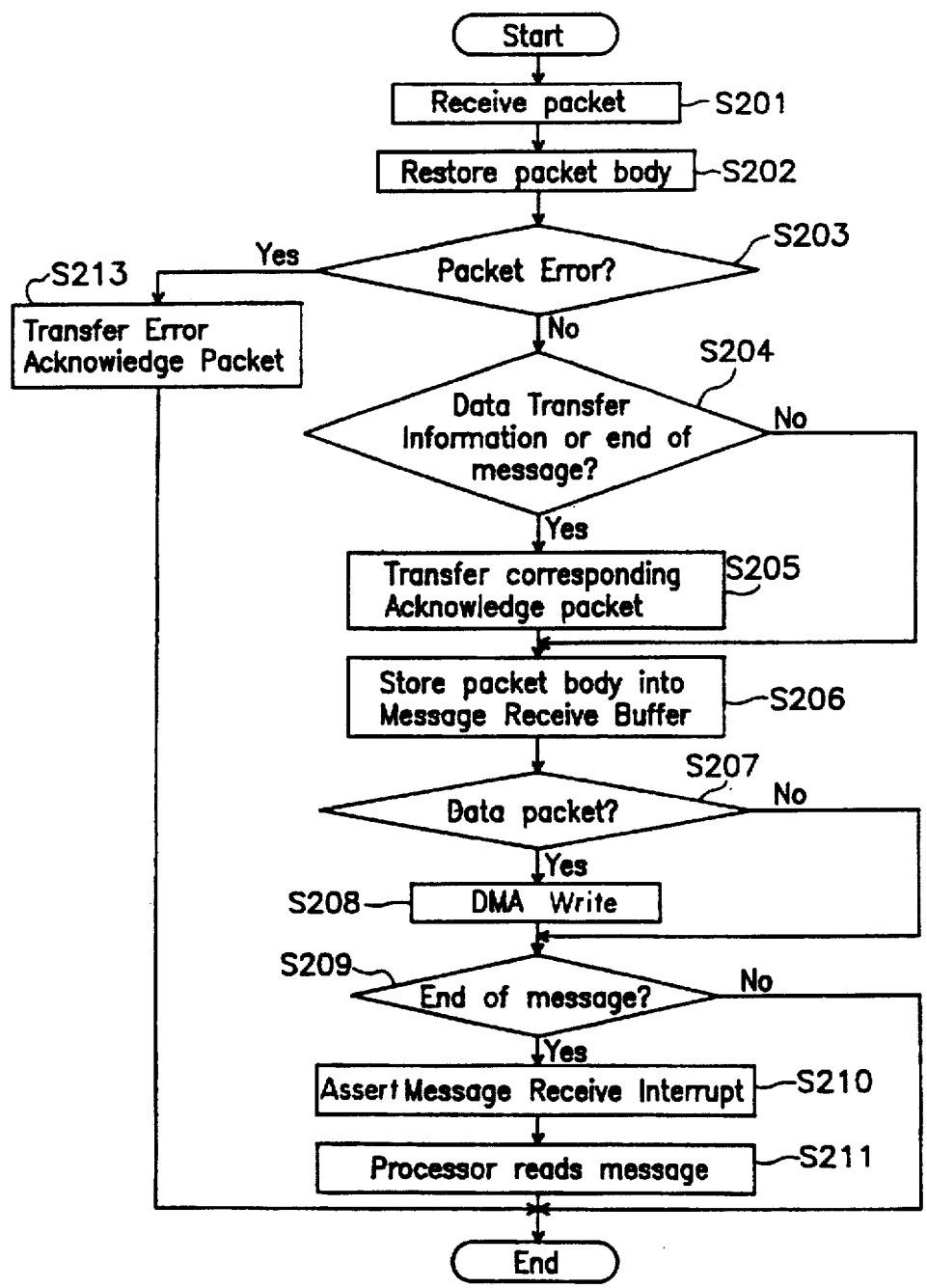
FIG. 8 is a flowchart to explain a method for receiving the messages according to the present invention.

FIG. 8 is a flowchart for explaining a method for receiving the messages.

Referring now to drawing, at steps S201 and S202, the network interface 200 at the destination node receives the packet and restores the original packet body by removing the control information flits 610, 620 and 630 from the packet.

At step S203, the network interface 200 at the destination node determines whether there exists an error in the packet body restored at step S202. If it is determined that there is an error in the message at step S203, it proceeds to step S213. At step S213, the network interface 200 at the destination node transfers the error acknowledgement packet to the source node, then the procedure ends. However, if there is no error in the message, it proceeds to step S204.

At step S204, it is determined whether or not the received packet is a data transfer information, or is the end of the message. If the received packet is a data transfer information, or is the end of the message, it proceeds to step S205. At step S205, the network interface 200 at the destination node transfers the corresponding acknowledgement packet to the source node. In the meantime, at step S204, if the received packet is not a data transfer information, and is not the end of the message, it proceeds to step S206.

At step S206, the receiving controller 221 stores the packet body into message receive transfer buffer 223.

At step S207, the network interface 200 at the destination node determines whether the packet body restored at step S202 is a data packet or not. If the packet body is determined as a data packet, the network interface 200 at the destination node stores the 64 bytes data, i.e. packet body, into the local shared memory using the DMA operation. However, if it is determined that the packet body is not a data packet at step S207, it proceeds to step S209.

At step S209, the network interface 200 at the destination node determines whether the received packet is the end of the message or not. If it is determined that the received packet is not the end of the message, the procedure ends. However, if the received packet is the end of the message, it proceeds to step S210.

At step S210, the network interface 200 at the destination node asserts the message receive interrupts to the processor and it proceeds to step S211. At step S211, the interrupted processor ends after reading the corresponding message. Here, the control message is stored in message receive buffer 223. For the data message, the data transfer information 900 is stored in the message receive buffer 223, and the data portions are stored in the local shared memory 350 at the destination node.

As described above, according to the advantages of the present invention, the messages are transferred in the optimal technique contingent on the characteristics and the attributes of the message by supporting both the techniques, such as a memory-mapped transfer technique and a DMA based transfer technique. It also can be transferred transparently to the software. Furthermore, the latency can be reduced by supporting the broadcast transfer and the multicast transfer for the control message in hardware, and the bandwidth can be increased, so that the message transfer can be optimized, thereby providing various transfer functions.

Although the present invention and its advantages have been described in detail, it should be understood that various changes, substitutions and alterations can be made herein without departing from the spirit and scope of the invention as defined by the appended claims.

What is claimed is:

1. A network interface for a computer system in which a plurality of nodes are connected with one another through an interconnection network for communicating messages which include data messages, each node including at least one processor and a local shared memory which are connected with one another through a node bus and connected through the network interface to the interconnection network, the network interface comprises:

a local bus which provides a parallel path for transferring data in said network interface;

a bus connection means for connecting the node bus and said local bus;

a sending means connected to said local bus for packetizing messages requested by the processor, and if a data message, for reading the data portion of the message out of the local shared memory through said local bus, the bus connection means and the node bus to produce a packet, and sending the packet to the interconnection network, said sending means including:

a temporary storage means for transmission for temporarily storing data, to the interconnection network;

a transfer control means for controlling a series of operations thereof by packetizing the messages for transfer requested by the processor, to send the packet to the interconnection network; and a direct memory access means for directly reading out the data portion of the data messages from the local shared memory; and a receiving means connected to said local bus for receiving a packet from the interconnection network, restoring the packet to produce a restored message and, if a data message, storing the data portion of the restored message in the local shared memory through said local bus, the bus connection means and the node bus.

2. A network interface for a message-passing computer system according to claim 1, wherein the temporary storage means for transfer includes:

a predetermined number of temporary storage means for transfer; and a direct memory access type of temporary storage means of sending data for directly reading out the data portions of the messages from the local shared memory using a direct memory access operation.

3. A network interface for a message-passing computer system according to claim 1, wherein the receiving means includes:

a temporary storage means for temporarily storing the packet by receiving it received from the interconnection network;

a receiving control means for controlling a series of operations thereof by restoring the packet, if data message, to store the data portion of the restored message into the local shared memory; and a direct memory access means for directly storing the data portion of the data messages into the local shared memory.

4. A network interface for a message-passing computer system according to claim 3, wherein the temporary storage means for receiving includes:

a predetermined number of temporary storage means for message receiving; and a direct memory access type of temporary storage means of receiving data for storing the data into the local shared memory using a direct memory access operation.

5. In a message-passing computer system in which a plurality of source nodes and destination nodes are connected with one another through an interconnection network for communicating messages, and more than one of processors and a local shared memory, which are connected with one another through a node bus, and are connected through a network interface to the interconnection network, a method of transmitting messages at the source nodes comprises the steps of:

a) requesting transfer of the messages to the network interface at the source node by the processor at the source node, wherein the requesting step a) comprises the step of storing control message or data transfer information of data message into the temporary storage means for transmission in the network interface at the source node by the processor at the source node in order to request the transfer of the messages;

b) reading out the data portion of data message to be transferred from the local shared memory by the network interface at the source node;

c) packetizing the messages by the network interface at the source node to produce a message packet and transfer the message packet to the destination node;

d) receiving an acknowledgement packet from the destination node by the network interface at the source node; and e) enabling a transfer completing interrupt.

6. A method of sending messages at a source node according to claim 5, wherein the reading step b) comprises the steps of:

b-1) determining as to whether the message of which the transfer has been requested at the step a) is control message or data message by the network interface at the source node; and b-2) if it is determined that the message are the data message at the determining step b-1), reading out a data as much as a predetermined size of blocks has from the local shared memory using a direct memory access operation by the network interface at the source node.

7. A method of sending messages at a source node according to claim 6 wherein the receiving step d) comprises the steps of:

d-1) determining as to whether or not there is no acknowledgement at the present, the packet is the end of the messages, and the packet is the data packet;

d-2) if it is determined that there is no acknowledgement at the present, the packet is not the end of the messages, and the packet is the data packet at the determining step d-1), proceeding to the step b-6) of the reading step 2);

d-3) if it is determined that there is an acknowledgement at the present, the packet is the end of the messages, or the packet is the data packet at the determining step d-1), receiving the acknowledgement packet from the destination node by the processor; and d-4) determining as to whether the acknowledgement packet received at the receiving step d-3) is an error acknowledgement, or a data transfer information acknowledgement; and d-5) if it is determined that the acknowledgement packet is error acknowledgement, or a data transfer information acknowledgement at the step d-4), proceeding to the reading step 6).

8. A method of sending messages at a source node according to claim 6, wherein the enabling step e) comprises the steps of:

e-1) determining as to whether or not the transfer completing interrupt is in enable state by the network interface at the source node;

e-2) if it is determined that the transfer completing interrupt is not in enable state at the determining step e-1), ending the procedure; and e-3) if it is determined that the transfer completing interrupt is in enable state at the determining step e-1), ending the procedure after the transfer completing interrupt is enabled.

9. In a message-passaging computer system in which a plurality of source nodes and destination nodes are connected with one another through an interconnection network for communicating messages, and more than one of processors and a local shared memory, which are connected with one another through a node bus, are connected through a network interface to the interconnection network, a method of receiving messages at the destination nodes comprises the steps of:

a) receiving a packet for restoring an original packet body from the packet by the network interface at the destination node;

b) transferring a corresponding acknowledgment packet depending on the restored packet body to the source node by the network interface at the destination node, wherein the transferring step b) comprises the steps of:

b-1) determining as to whether there is an error in the packet body restored by receiving at the receiving step a), by the network interface at the destination node;

b-2) if it is determined that there is an error in the packet body at the step b-1), transferring the error acknowledgment packet to the source node and ending the procedure by the network interface at the destination node;

b-3) if it is determined that there is no error in the packet body at the step b-1), determining as to whether or not the packet body is data transfer information or it is the end of the messages; and b-4) if it is determined that the packet body is the data transfer information or it is the end of the messages at the determining step b-3), transferring the corresponding acknowledgment packet to the source node by the network interface at the destination node;

c) storing a data packet into the local shared memory at the destination node by the network interface at the destination node; and d) informing the processor at the destination node of the fact that a message receiving has been completed, by the processor at the source node.

10. A method of receiving messages at a destination node according to claim 9, wherein the storing step c) comprises the steps of:

c-1) determining as to whether or not the original packet body restored by receiving at the receiving step a) is the data packet, by the network interface at the destination node;

c-2) if it is determined that the original packet body is the data packet at the determining step c-1), storing a data as much as a predetermined size of block has from the local shared memory using a direct memory access operation by the network interface at the destination node:

c-3) if it is determined that the original packet body is not the data packet at the determining step c-1) or after the storing step c-2), determining as to whether or not it is the end of the messages, by the network interface at the destination node;

c-4) if it is determined that it is not the end of the messages at the determining step c-3), ending the procedure; and c-5) if it is determined that it is the end of the messages, proceeding to the informing step d) after a message receiving interrupt is enabled.

11. A method of receiving messages at a destination node according to claim 10, wherein, at the storing step c-2), the size of block is 64 byte.

12. A method of receiving messages at a destination node according to claim 9, wherein, in order to receive the messages at the informing step d), reading out corresponding messages and ending the procedure, by the processor at the destination node. claim 13. In a message-passing computer system in which a plurality of source nodes and destination nodes are connected with one another through an interconnection network for communicating messages, and a plurality of processors and a local shared memory, which are connected with one another through a node bus, are connected through a network interface to the interconnection network, a method of formatting different types of messages which are transmitted in the computer system, the method including:

formatting each message to indicate whether the message is:

a data message which is a direct object to transfer data;

a broadcast control message;

a point-to-point control message; and a multicast control message;

if a broadcast or a point-to-point control message, formatting such control message to include different control information required for a broadcast transfer for transferring the messages to all of the nodes connected to the interconnection network, and a point-to-point transfer by the network interface;

if a multicast control message formatting such control message to include different control information required for a multicast transfer; and formatting a control information flit to include information on a transfer packet.

13. In a message-passing computer system in which a plurality of source nodes and destination nodes are connected with one another through an interconnection network for communicating messages, and a plurality of processors and a local shared memory, which are connected with one another through a node bus, are connected through a network interface to the interconnection network, a method of formatting different types of messages which are transmitted in the computer system, the method including formatting each message to indicate whether the message is:

a data message which is a direct object to transfer data;

a broadcast control message a point-to-point control message; and a multicast control message If a broadcast or a point-to-point control message, formatting such control message to include different control information required for a broadcast transfer for transferring the messages to all of the nodes connected to the interconnection network, and a point-to-point transfer by the network interface;

if a multicast control message formatting such control message to include different control information required for a multicast transfer; and formatting a control information flit to include information on a transfer packet.

14. A method of formatting messages for transferring the messages according to claim 13, wherein the data message comprises:

a data being a direct object to transfer data; and a data transfer information including the information required for transferring the data.

15. A method of formatting messages for transmitting the messages according to claim 14, wherein the data transfer information comprises:

a message transfer information area representing a basic control information required for transferring the messages;

a data source address area representing an address of source node which sends the data;

a data location and length area representing a location and length of the data;

a data destination address area representing an address of destination node which receives the data; and a user defined area capable of using by arbitrarily defining it by a user.

16. A method of formatting messages for transmitting the messages according to claim 15, wherein the message transfer information area comprises:

a source processor identifier field representing whether which processor of a predetermined number of processors at the source node has requested the message transfer to the network interface;

a source node identifier field representing an original identifier of the source node transferring the messages;

a message length field or a data transfer information length field representing the length of the data transfer information to be transferred;

a destination node identifier field representing an original identifier of the destination node to which the messages are being transferred;

a transfer success interrupt enable field representing the enable status of the transfer success interrupt for effecting the network interface to inform the processor that it has successfully transferred the messages requested by the processor to the network interface by enabling the transfers success interrupt by the network interface depending on the enable status of the transfer success interrupt when the messages transfer has successfully been completed without an error;

a multicast field representing that the multicast control message is being transferred;

a broadcast field representing that the broadcast control message is being transferred;

an emergency field representing an emergency transfer if it is determined that one of the messages is being transferred prior to the other messages by the network interface;

a data transfer field representing that the data message is being transferred; and reserved fields presently being not used, so as to be effectuated by defining them when extending the function of the system.

17. A method of formatting messages for transferring the messages according to claim 16, wherein the actual length of the message or the data transfer information to be transferred equals to 4 times the sum of the value of the message length field or the data transfer information field and 1.

18. A method of formatting messages for transferring the messages according to claim 16, wherein the size of the source node identifier or the destination node identifier equals to the smallest integer number among the integer numbers which are not smaller than $\log_2 N$, wherein N is the maximum number of the nodes which can be connected to the interconnection network.

19. A method of formatting messages for transferring the messages according to claim 15, the data source address area comprises:

a source address field representing a start address in which the data to be transferred is stored; and reserved fields presently being not used, so as to be effectuated by defining them when extending the function of the system.

20. A method of formatting messages for transferring the messages according to claim 15, wherein the data location and length area comprises a data length field representing a length of the data to be transferred;

a data location field representing a storage location in the local shared memory by receiving the data from the destination node to store it into the storage location;

a destination address assigning field representing whether or not a destination address of the data transfer has been assigned; and reserved fields presently being not used, so as to be effectuated by defining them when extending the function of the system.

21. A method of formatting messages for transferring the messages according to claim 20, wherein the storage location of the data represented in the data location field is located in the local shared memory at the destination node, and corresponds to a location of a preselected frame in which the data is stored among a plurality of frames of a temporary data buffer comprised of a plurality of frames.

22. A method of formatting messages for transferring the messages according to claim 20, wherein the data location field has a predetermined value, only when the destination address assigning field represents that the destination address has not been assigned.

23. A method of formatting messages for transferring the messages according to claim 20, wherein the destination address assigning field has a predetermined value, only when the destination address assigning field represents that the destination address has been assigned.

24. A method of formatting messages for transferring the messages according to claim 15, wherein the data destination address area comprises:

a destination address field representing a start location in the local shared memory which stores the data received from the destination node to store it into the storage location; and reserved fields presently being not used, so as to be effectuated by defining them when extending the function of the system.

25. A method of formatting messages for transferring the messages according to claim 13, wherein the multicast transfer, the broadcast transfer and the emergency transfer are not supported for the data message, such that the multicast field, the broadcast field and the emergency field do not have any value, and as for the data message, the data transfer field has a predetermined value representing that a data message is being transferred.

26. A method of formatting messages for transferring the messages according to claim 13, wherein the broadcast control message comprises:

a message transfer information area representing a basic control information required for transferring the messages; and a user defined area capable of using by arbitrarily defining it by a user.

27. A method of formatting messages for transferring the messages according to claim 26, wherein the message transfer information area comprises:
- a source processor identifier field representing whether which processor of a predetermined number of processors in the source node has requested the message transfer to the network interface;
- a source node identifier field representing an original identifier of the source node transferring the messages;
- a message length field or a data transfer information length field representing the length of the data transfer information to be transferred;
- a destination node identifier field representing an original identifier of the destination node to which the messages are being transferred;
- a transfer success interrupt enable field representing the enable status of the transfer success interrupt for effecting the network interface to inform the processor that it has successfully transferred the message requested by the processor to the network interface by enabling the transfers success interrupt by the network interface depending on the enable status of the transfer success interrupt when the message transfer has successfully been completed without an error;
- a multicast field representing that the multicast control message is being transferred;
- a broadcast field representing that the broadcast control message is being transferred;
- an emergency field representing an emergency transfer if it is determined that one of the messages is being transferred prior to the other messages by the network interface;
- a data transfer field representing that the data transfer information is being transferred; and
- reserved fields presently being not used, so as to be effectuated by defining them when extending the function of the system.

28. A method of formatting messages for transferring the messages according to claim 27, wherein the actual length of the control message equals to 4 times the sum of the value of the control message length field and 1.

29. A method of formatting messages for transferring the messages according to claim 27, wherein the size of the source node identifier field or the destination node identifier field equals to the smallest integer number among the integer numbers which are not smaller than $\log_2 N$, wherein N is the maximum number of the nodes which can be connected to the interconnection network.

30. A method of formatting messages for transferring the messages according to claim 27, wherein as for the broadcast control message and the point-to-point control message, the multicast field has a predetermined value representing that the multicast is not being transferred.

31. A method of formatting messages for transferring the messages according to claim 27, wherein as for the broadcast control message and the point-to-point control message, the broadcast field has a predetermined value representing that the broadcast control message is being transferred.

32. A method of formatting messages for transferring the messages according to claim 27, wherein as for the broadcast control message and the point-to-point control message, the data transfer field has a predetermined value representing that the data transfer information is not being transferred.

33. A method of formatting messages for transferring the messages according to claim 13, wherein the data multicast control message comprises:
- a message transfer information area representing a basic control information required for transferring the messages;
- a predetermined number of multicast node identifier area; and
- a user defined area capable of using by arbitrarily defining it by a user.

34. A method of formatting messages for transferring the messages according to claim 33, wherein the message transfer information area comprises:
- a source processor identifier field representing whether which processor of a predetermined number of processors in the source node has requested the message transfer to the network interface;
- a source node identifier field representing an original identifier of the source node transferring the messages;
- a message length field representing the length of the message to be transferred;
- a destination node identifier field representing an original identifier of the destination node to which the messages are being transferred;
- a transfer success interrupt enable field representing the enable status of the transfer success interrupt for effecting the network interface to inform the processor that it has successfully transferred the message requested by the processor to the network interface by enabling the transfers success interrupt by the network interface depending on the enable status of the transfer success interrupt when the message transfer has been successfully completed without an error;
- a multicast field representing that the multicast control message is being transferred;
- a broadcast field representing that the broadcast control message is being transferred;
- an emergency field representing an emergency transfer if it is determined that one of the messages is being transferred prior to the other messages by the network interface;
- a data transfer field representing that the data transfer information is being transferred; and
- reserved fields presently being not used, so as to be effectuated by defining them when extending the function of the system.

35. A method of formatting messages for transferring the messages according to claim 34, wherein the actual length of the control message equals to 4 times the sum of the value of the control message length field and 1.

36. A method of formatting messages for transferring the messages according to claim 34, wherein the size of the source node identifier field or the destination node identifier field equals to the smallest integer number among the integer numbers which are not smaller than $\log_2 N$, wherein N is the maximum number of the nodes which can be connected to the interconnection network.

37. A method of formatting messages for transferring the messages according to claim 34, wherein as for the multicast control message, the multicast field has a predetermined value representing that the multicast control message is being transferred.

38. A method of formatting messages for transferring the messages according to claim 34, wherein as for the multicast control message, the broadcast field has a predetermined value representing that the broadcast is not being transferred.

39. A method of formatting messages for transferring the messages according to claim 34, wherein as for the multicast control message, the data transfer field has a predetermined value representing that the data transfer information is not being transferred.

40. A method of formatting messages for transferring the messages according to claim 33, wherein the multicast node identifier area is comprised of a predetermined number of multicast node identifier fields.

41. A method of formatting messages for transferring the messages according to claim 40, wherein the multicast node identifier fields comprises:
   a multicast node identifier region representing an identifier at the destination node to be transferred using a multicast transfer technique;
   an identifier valid region representing as to whether or not the multicast identifier region is valid, and transferring the multicast control message only to the node indicating that the node identifier of which the network interface is valid.

42. A method of formatting messages for transferring the messages according to claim 13, wherein the control information flit comprises:
   a control information flit for control packet for transferring the control message;
   a control information flit for data control packet for transferring the data transfer information of the data message;
   a control information flit for data packet for transferring the data portion of the data message; and
   a control information flit for acknowledgement packet for replying an acknowledgement to the transferred packet.

43. A method of formatting messages for transferring the messages according to claim 42, wherein the control information flit for control packet and the control information flit for data control packet comprises:
   a packet type field representing the type of the packet;
   an identifier field for temporary storage means designating the temporary storage means to which the packet to be transferred is temporarily stored;
   a source node identifier field representing an original identifier at source node which sends the messages;
   a packet length field representing the length of the packet to be transferred;
   a multicast field representing that the multicast control message is being transferred;
   a broadcast field representing that the broadcast control message is being transferred;
   a multicast field representing that the multicast control message is being transferred;
   an emergency field representing an emergency transfer if it is determined that one of the messages is being transferred prior to the other messages by the network interface; and
   reserved fields presently being not used, so as to be effectuated by defining them when extending the function of the system.

44. A method of formatting messages for transferring the messages according to claim 43, wherein the packet type field represents either the data packet or the data control packet.

45. A method of formatting messages for transferring the messages according to claim 43, wherein the identifier field for temporary storage means is returned to the network interface at the source node when responding to the packet, thereby causing the network interface to identify the acknowledgement for which packet being concerned.

46. A method of formatting messages for transferring the messages according to claim 43, the packet length field represents the actual length of the packet body except for a packet header(=a routing tag and the control information flit), and the actual length thereof equals to 4 times the sum of the value of the value of the packet length field and 1.

47. A method of formatting messages for transferring the messages according to claim 42, wherein the control information flit for data packet comprises:
   a packet type field representing the type of the packet;
   an identifier field for temporary storage means designating the temporary storage means to which the packet to be transferred is temporarily stored;
   a packet sequence number field representing a sequence number of the packet in which a transfer occurs; and
   reserved fields presently being not used, so as to be effectuated by defining them when extending the function of the system.

48. A method of formatting messages for transferring the messages according to claim 47, wherein the packet type field represents the data packet.

49. A method of formatting messages for transferring the messages according to claim 42, wherein the control information flit for acknowledgement packet comprises:
   a packet type field representing the type of the packet;
   an identifier field for temporary storage means designating the temporary storage means to which the packet to be transferred is temporarily stored;
   a packet sequence number field representing a sequence number of the packet in which a transfer occurs; and
   an unacceptable error field representing an which is unable to receive the packet except for a sequence error, a parity error and a buffer-full error;
   a buffer-full error field for temporary storage means representing a full of the temporary storage means;
   a parity error field representing that there is a parity error in the received packet;
   a sequence error field representing that there is a sequence caused by not keeping a transfer protocol during transferring the packet;
   an acknowledgement type field representing the type of the acknowledgement; and
   reserved fields presently being not used, so as to be effectuated by defining them when extending the function of the system.

50. A method of formatting messages for transferring the messages according to claim 49, wherein the packet type field represents the acknowledgement packet.

51. A method of formatting messages for transferring the messages according to claim 49, wherein the acknowledgement type field represents one of a receiving acknowledgement for the whole of the message, a receiving acknowledgement for data transfer information, an error acknowledgement for data packet, and an error acknowledgement for packet other than the data packet.

52. A method of formatting messages for transferring the messages according to claim 49, wherein the packet sequence number field is valid only when the acknowledgement type field has a predetermined value representing an error acknowledgement for data packet.

* * * * *

(12) EX PARTE REEXAMINATION CERTIFICATE (10409th)

United States Patent
Moh et al.

(10) Number: US 5,790,530 C1
(45) Certificate Issued: Nov. 20, 2014

(54) MESSAGE-PASSING MULTIPROCESSOR SYSTEM

(75) Inventors: Sang-Man Moh, Yusong-ku (KR); Sang-Seok Shin, Yusong-ku (KR); Suk-Han Yoon, Yusong-ku (KR)

(73) Assignee: Electronics and Telecommunications Research Institute, Yosung-Ku, Daejeon-Shi (KR)

Reexamination Request:
No. 90/013,174, Mar. 7, 2014

Reexamination Certificate for:
Patent No.: 5,790,530
Issued: Aug. 4, 1998
Appl. No.: 08/573,494
Filed: Dec. 15, 1995

(30) Foreign Application Priority Data

Nov. 18, 1995 (KR) ..................................... 95-42112

(51) Int. Cl.
*G06F 13/12* (2006.01)
*H04L 12/40* (2006.01)
*H04L 12/56* (2006.01)

(52) U.S. Cl.
USPC .......................................... 370/363; 370/402

(58) Field of Classification Search
None
See application file for complete search history.

(56) References Cited

To view the complete listing of prior art documents cited during the proceeding for Reexamination Control Number 90/013,174, please refer to the USPTO's public Patent Application Information Retrieval (PAIR) system under the Display References tab.

*Primary Examiner* — Ovidio Escalante

(57) ABSTRACT

A message-passing multiprocessor system, such as, a network interface, a method for transferring messages between a node and a node, and a method for formatting the same in a message-passing computer system are disclosed herein. In the network interface for a computer system there are a plurality of nodes connected with one another through an interconnection network for communicating messages, and more than one processor, and a local shared memory, which are connected with one another through a node bus. These components are connected via the network interface to the interconnection network, the multiprocessor comprises a local bus acting as a path for transferring data in the network interface, a bus connection for connecting the node bus and the local bus, a transferring component for packetizing the messages requested by the processor, if data message, by reading them out from the local shared memory via the local bus, the bus connection and the node bus to produce a packet, and sending the packet to the interconnection network, and a receiver for receiving the message packet from the interconnection network, restoring it to produce a restored message and, if data portion of the data message, storing the restored packet body into the local shared memory through the local bus, the bus connection and the node bus.

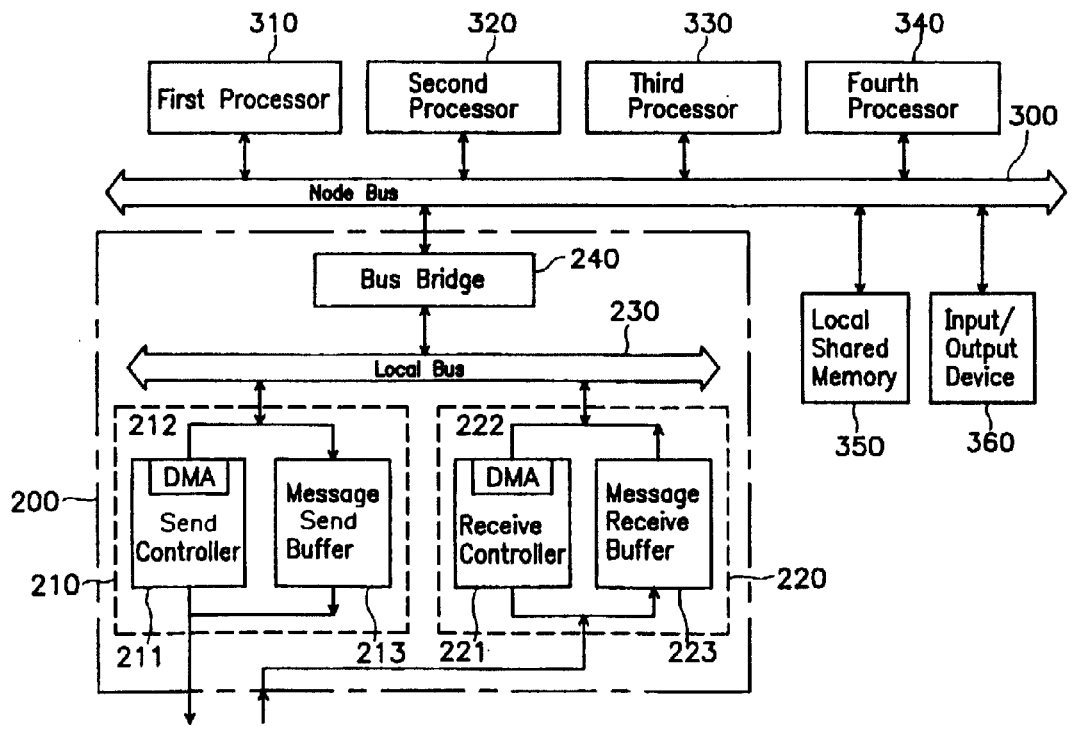

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 5-8 is confirmed.

Claims 1-4 and 9-52 were not reexamined.

\* \* \* \* \*